United States Patent [19]
Rafeld

[11] Patent Number: 5,341,843
[45] Date of Patent: Aug. 30, 1994

[54] PLUMBING AND HEATING PIPE SYSTEM FOR WATER SUPPLY PURPOSES, MADE EITHER COMPLETELY OR MAINLY OF PLASTIC MATERIAL, ESPECIALLY OF POLYPROPYLENE

[75] Inventor: Karl Rafeld, Biessenhofen-Ebenhofen, Fed. Rep. of Germany

[73] Assignee: Rafeld Kunststofftechnik GmbH u. Co. KG., Biessenhofen-Ebenhofen, Fed. Rep. of Germany

[21] Appl. No.: 89,718

[22] Filed: Jul. 9, 1993

Related U.S. Application Data

[62] Division of Ser. No. 792,316, Nov. 14, 1991.

[30] Foreign Application Priority Data

Nov. 15, 1990 [DE] Fed. Rep. of Germany ... 9015675[U]
Apr. 24, 1991 [DE] Fed. Rep. of Germany ... 9105038[U]
Apr. 26, 1991 [DE] Fed. Rep. of Germany ... 9105171[U]
May 10, 1991 [DE] Fed. Rep. of Germany ... 9105823[U]
May 10, 1991 [DE] Fed. Rep. of Germany ... 9105824[U]

[51] Int. Cl.⁵ .................... F16L 3/00; F16L 33/00
[52] U.S. Cl. .................... 137/343; 251/366; 237/56; 285/238; 285/289; 285/423
[58] Field of Search .............. 137/343; 237/56; 285/289, 330, 423, 238; 251/366

[56] References Cited

U.S. PATENT DOCUMENTS

| 574,782 | 1/1897 | Bunker | 237/56 |
| 1,024,560 | 4/1912 | Dale | 137/343 |
| 1,026,236 | 5/1912 | Ahrens | 237/56 |
| 3,232,568 | 2/1966 | Lennon et al. | 137/343 |
| 4,009,728 | 3/1977 | Parise | 137/343 |
| 4,893,848 | 1/1990 | Melcher | 285/921 |

FOREIGN PATENT DOCUMENTS

| 1330403 | 9/1973 | United Kingdom | 237/56 |
| 2100991 | 1/1983 | United Kingdom | 137/343 |

*Primary Examiner*—A. Michael Chambers
*Attorney, Agent, or Firm*—Kalish & Gilster

[57] ABSTRACT

A plumbing and heating pipe system for water supply purposes, made either completely or mainly of plastic material, especially of polypropylene, said system being provided with metallic connecting sleeves as well as reducers for connecting the plastic pipes to fittings of metallic materials, and being provided with shut-off valves made of plastic material and having a plastic-encased metallic valve seat for mounting in pipe lines, and being provided with pressure-type screw connections for the pipes to be joined to each other and with reducers for connection to radiators, wherein a welding device having an arrangement for equalizing the lengths of the plastic pipes is used to weld parallel plastic pipes.

20 Claims, 7 Drawing Sheets

PLUMBING AND HEATING PIPE SYSTEM FOR WATER SUPPLY PURPOSES, MADE EITHER COMPLETELY OR MAINLY OF PLASTIC MATERIAL, ESPECIALLY OF POLYPROPYLENE

CROSS-REFERENCE TO RELATED APPLICATION

This application is a division of allowed application Ser. No. 07/792,316, filed Nov. 14, 1991.

BACKGROUND AND SUMMARY OF THE INVENTION

Plumbing and heating pipe systems of the above-mentioned kind have been used for some time both in the construction of new housing and in renovation and repair work in old buildings, because such systems have proven satisfactory relative to the conventional metallic pipe systems mainly due to the fact that there are no corrosion problems and the pipe systems can be installed much more easily and at less expense.

Such systems comprise essential connecting elements between the plastic pipes and the fittings used as well as between the pipes themselves in the form of reducers and pipe sleeves. Also comprised are shut-off valves made of plastic material and having metallic valve seats, as well as pressure-type screw connections for hot water and aggressive liquids and also special reducers for connection to radiators. Furthermore, such a system comprises special means for assembling the above-mentioned elements with the plastic pipes, i.e. mounting devices.

Such essential components of the plumbing and heating pipe system of the type according to the invention also comprise a plastic-enclosed metallic joining sleeve for joining plastic pipes to fittings made of metallic materials, in which one sleeve end includes an offset bore for welding a plastic pipe therein while the other sleeve end includes an injected metallic connecting sleeve formed with a threaded portion for having a fitting screwed thereon, wherein at least one anti-twist means is provided on the outer surface of the connecting sleeve end, and parallel seal grooves extend around the outer cylindrical surface of the connecting sleeve.

As regards the tightness and working reliability of such sleeve connections, it is of decisive importance that the connection between the injected or moulded plastic material and the metallic sleeve surface should be such that the fluid to be conveyed through the sleeve will not pass along the outside of the metallic connecting sleeve, i.e. the formation of creep flows between the plastic material such as polypropylene and the metal should be inhibited because these might cause moisture to penetrate into the surrounding brickwork in cases in which the connecting sleeve is concealed.

It has been known for the purpose of preventing such creep fluid flows to provide a portion of the outer surface of the joining sleeve with flutes or grooves of square or rectangular cross-section into which the plastic material enters upon injection or moulding, but it has been found that due to the shrink stresses to which the plastic material is subjected cavities will be formed in the initially completely filled seal grooves through which cavities the moisture may creep.

It is therefore an object of the present invention to provide the seal grooves in such a way that irrespective of any possible shrink stresses a perfect seal is ensured between the plastic material and the surface of the connecting sleeve.

The specified object is solved in that the seal grooves have conical or V-shaped cross-section.

A further component of the plumbing and heating pipe system of the kind concerned in the invention is a reducer for connecting the plastic pipes to fittings of metallic materials, in which similar to the above-described joining sleeve one end has a bore for welding the plastic pipe while the other end has an injected metallic connecting sleeve formed with a screw thread for screw-connecting the fitting either internally or externally, and in which furthermore anti-twist means is provided relative to a plastic member surrounding the connecting sleeve, said anti-twist means being constituted by cavities in the form of slots, bores and the like formed in the end-side internal end of the connecting sleeve into which the injected plastic material will penetrate, wherein additionally annular grooves are formed on the cylindrical outer surface of the metallic connecting sleeve into which the injected plastic material will likewise penetrate.

Here, too, it has been found that anchoring of the plastic composition injection-moulded onto the surface of the connecting sleeve is not fully satisfactory within the annular grooves due to the shrink stresses occurring during solidification of the plastic material, so that in this case also leakages result from creep fluid flows which can be prevented in accordance with the present invention by the feature that the annular grooves of this reducer are likewise given a V-shaped cross-section.

Also, the plumbing and heating pipe system of the kind according to the invention comprises a shut-off valve made of plastic material and including a plastic-sheathed metallic valve seat for mounting in plumbing and heating pipe systems, comprising two series-arranged pipe connecting sleeve portions and an internally threaded valve body receptacle therebetween which constitutes the valve seat and into which the valve body may be screwed.

Such plastic valves or plastic-sheathed valves exhibit the significant drawback that their metallic valve seat is in the form of a T-piece which is a relatively complex geometrical shape requiring considerable effort in respect of manufacture and processing and serving the purpose of firmly anchoring the valve seat body within said plastic sheath material.

It is a further drawback that the fluid tightness of the valve seat body inside the plastic material is not fully satisfactory because in this case also creep paths for the fluid will be formed due to the shrink stresses occurring when the plastic material is cooled subsequent to being injected or moulded. It is therefore a further object of the invention—although this is closely related to the first-mentioned object—to design the shut-off valve of the specified kind in such a way that the manufacturing costs are reduced while the working reliability and especially the tightness of the reducer is improved.

In accordance with the invention the specified object is solved in that the metallic valve body receptacle is a rotary body of cylindrical configuration which is provided on a portion of its cylindrical outer surface with flow bores which extend transversely to its longitudinal axis and which can be closed by means of the valve body, while it is provided on other portions of its surface with anti-twist means as well as with sealing elements against fluid leakage from the pipe connecting sleeve members, so that the valve seat member need not be formed as a T-piece.

Another important component of the plumbing and heating pipe system of the present invention is a pressure-type screw connection which is particularly suitable for hot water and aggressive liquids and is used to interconnect two conduits or a conduit and a nipple such that this joint can withstand relatively high pressures and temperatures without loss of tightness.

This is achieved in accordance with the present invention by a union nut provided with an internal screw thread and having a bottom-side and a central opening for the passage of one of two pipes therethrough, the union nut being adapted to receive an end flange of the one pipe and to be screw-connected with the external screw thread of a nut surrounding the other liquid pipe, the bottom end of said further nut being adapted to be screwed against the end flange of the second liquid pipe, said end flange resting against the end flange of the first liquid pipe.

It is ensured by this configuration that even fluid pipes made of plastic material, especially polypropylene, which are resistant to most aggressive and hot liquids, may be screwed together in such a way that the screw connection will not become unscrewed under the action of pressure and heat.

Also, the plumbing and heating pipe system according to the invention comprises a reducer developed for the connection of radiators in rooms, especially for installation of the heating pipes so as to be concealed by the skirting board, said reducer comprising two interconnected pipe members which follow the extension of the skirting board and one of which is adapted for connection to the heating water flow while the other one is adapted for connection to the heating water return.

When already existing buildings, especially old buildings, are equipped with central heating as is frequently necessary when old buildings are refurbished, the concealed installation of the heating pipes is often avoided because of the costs and also for structural reasons so that the heating pipes are disposed behind the skirting board to be concealed thereby, the heating water flow and return pipes being installed on top of each other along the wall of the room. In these cases the radiators are connected to the thus installed heating pipes by means of reducers for connecting the hot-water flow and return of the radiators to the corresponding pipes.

Due to the superposed installation of the two heating pipes in the vicinity of the skirting board it was necessary until recently to pass the flow and the return of the respective radiator over the upper heating pipe so as to have it terminate into the lower heating pipe. Thereby the planar provision of the heating pipes along the wall was interrupted by bulges which require either a corresponding interruption of the skirting board with consequent adapting work and an awkward appearance, or the provision of corresponding recesses in the brickwork for accommodating such connections.

It is therefore an additional object of the present invention to design the reducer of the above-specified kind in such a way that the two pipe members for the heating water flow and return are interconnected in such a way that complete concealment by the skirting board is made possible without having to cut open or otherwise change the appearance of the board to this end.

In accordance with the present invention the specified object is solved in that the two pipe members are disposed one above the other and the upper pipe member includes the two pipe unions for the heating water flow and return, one of said pipe unions bridging the cross-section of the upper pipe member inside the contour of said pipe member by means of a bridging passageway which opens into the bottom pipe member inside the contour of the same.

Finally, the plumbing and heating pipe system according to the present invention also comprises an arrangement for a welding device for welding parallel plastic pipes by means of which an end-side equalization of the plastic pipe lengths can be made. When installing pipelines of such systems, such plastic pipes frequently require welding to pipe fittings such as reducing means, pipe sleeves, elbows and T-pieces, and in many cases such pipes must be installed in parallel to each other and accurately equalized in respect of their ends.

In order to achieve a rapid length equalization and to ensure that such equalization is thereafter maintained, i.e. that the parallel pipes cannot be moved relative to each other while work is performed thereon for instance with a welding device, an arrangement has been developed in accordance with the invention which is characterized by a straddling body adapted to be arranged on the parallel plastic pipes and having a bracket member adapted to be pivoted upwardly, said bracket member in its upwardly pivoted position being swingable downwardly transversely to the longitudinal pipe axes over the pipe ends and having an end plate against which the end faces of the pipe ends abut.

Advantageous embodiments of the invention have been characterized in the subclaims.

DESCRIPTION OF THE DRAWINGS

Below, the invention will be explained in detail by means of the embodiments thereof as illustrated in the drawing, in which.

DETAILED DESCRIPTION OF THE PREFERRED EMBODIMENTS OF THE PRESENT INVENTION

Figure 1:
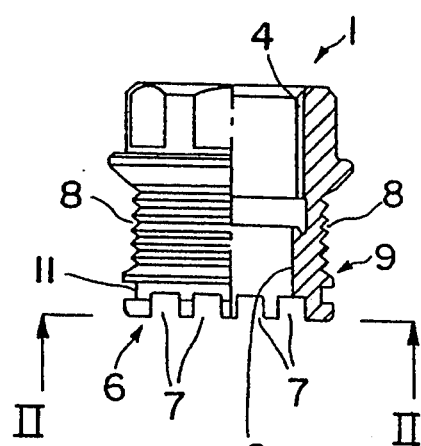
FIG. 1 is a partial longitudinal sectional view of a metallic connecting sleeve without injected plastic sheath.
Figure 2:
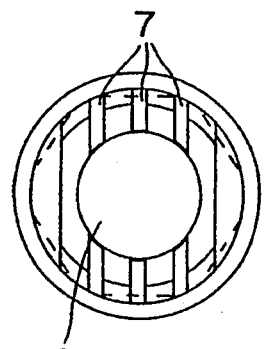
FIG. 2 is an end view of the rear end of the connecting sleeve of FIG. 1 in the direction of the arrows A—A.
Figure 3:
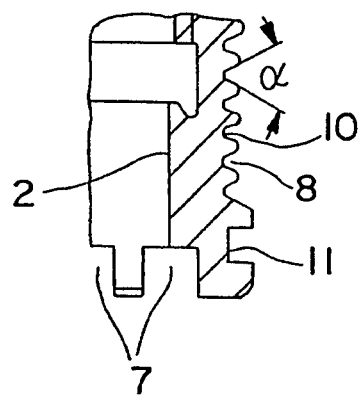
FIG. 3 is an enlarged sectional detail of the sectional portion of the connecting sleeve of FIG. 1 which comprises the seal grooves.

The metallic connecting sleeve 1 illustrated in FIGS. 1 to 3 is provided with an internally threaded portion 4 into which a fitting such as a tap can be screwed. The portion of its cylindrical circumference which is towards the rear end is formed with parallel seal grooves 8 of V-cross-section which are closely adjacent each other and have a cone angle (FIG. 3) of 55° which has proven especially suitable for the external sealing of the sleeve against creep fluid flows. This is due to the fact that the plastic material such as polypropylene, which is to be injected or moulded onto the metallic connecting sleeve for manufacturing the joining sleeve, enters the seal grooves and will shrink upon curing. The shrink stresses resulting therefrom are, however, relatively small in the vicinity of the bottom 10 of each V-shaped seal groove 8 because a comparatively small quantity of plastic material is present at the groove bottom due to the V-shaped or conical design thereof which quantity, although subject to said shrink stresses, due to its small mass results in a negligible slight shrinkage of the plastic material so that the grooves will remain substantially filled during shrinkage of the plastic material and thereby will be able to fulfill their sealing function, i.e. to inhibit creeping fluid flows which exit from the through-bore 2 over the rear end 6 of the connecting sleeve and tend to flow along the outer surface of the connecting sleeve towards the front end thereof.

The rear end 6 of the connecting sleeve 1 is provided with slots 7 in a manner known per se, into which plastic material will also enter so as to secure the connecting sleeve in this way within the plastic composition against twisting. In this respect the slots 7 constitute anti-twist means. The twisting forces are caused by the fact that upon screwing and unscrewing turning forces are introduced into the connecting sleeve either via the internal screw threads 4 or—in the embodiment of FIG. 4—via the external screw threads 5—which turning forces before being transferred to the mortar which surrounds the concealed joining sleeve must initially be transferred to the surrounding plastic material sheath. This is done by means of the positive connection caused by the slots 7 between the metallic connecting sleeve and the plastic material.

In addition to the anti-twist function between connecting sleeve and plastic material there is also provided a firm connection between the two specified parts or materials in the form of the annular groove 11 which is formed at the rear end of the connecting sleeve 3 and extends about the outer circumference and into which the plastic material will also enter during the injecting or moulding process just as in the case of the seal grooves 8.

Figure 4:
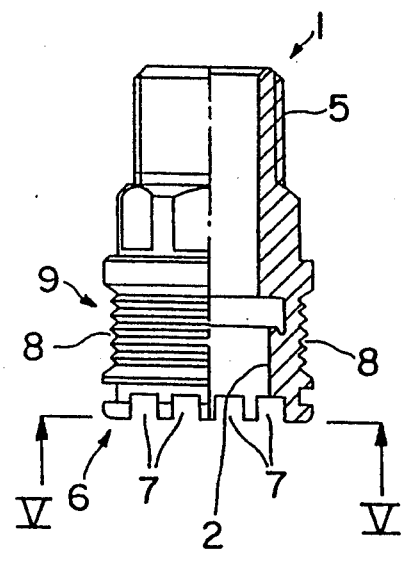
FIG. 4 is a partially sectional side view of a connecting sleeve provided with external screw threads.
Figure 5:
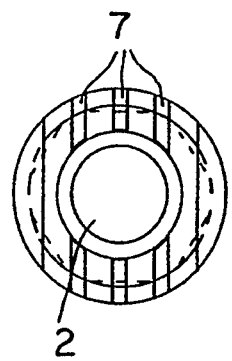
FIG. 5 is an end view of the rear end of the connecting sleeve of FIG. 4 in the direction of the arrows A—A.
Figure 6:
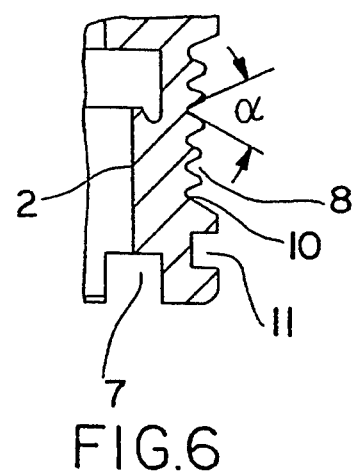
FIG. 6 is an enlarged detail of the portion of the connecting sleeve of FIG. 4 which comprises the seal grooves.

The embodiment of the joining sleeve illustrated in FIGS. 4 to 6 differs from the joining sleeve according to FIGS. 1 to 3 substantially only in that in the former case the fitting is secured by means of internal screw threads 4 within the sleeve whereas in the latter case external screw threads 5 are used to secure the fitting, said external screw threads requiring a corresponding extension of the connecting sleeve. Therefore the reference characters used in FIGS. 1 to 3 also apply correspondingly to FIGS. 4 to 6.

Figure 7:
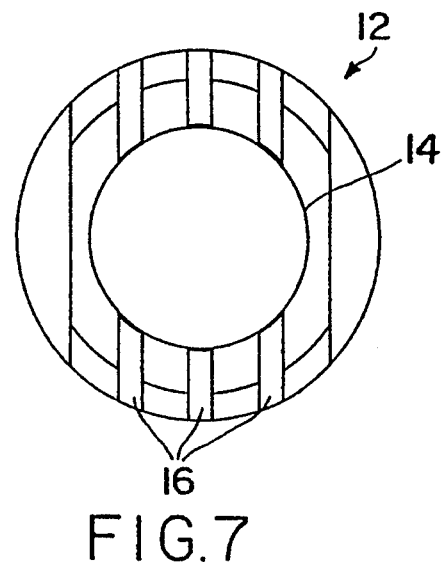
FIG. 7 is a plan view showing the rear end face of the connecting sleeve for a reducer.
Figure 8:
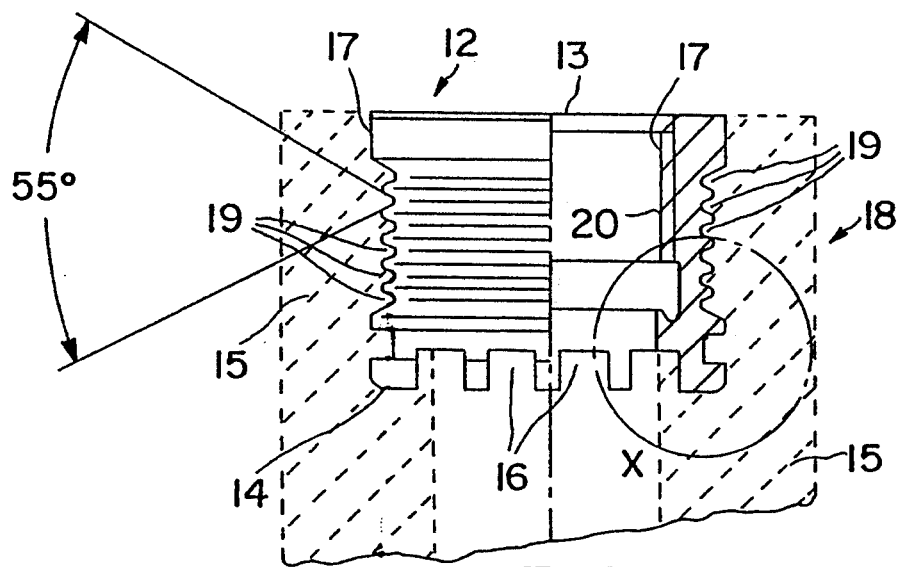
FIG. 8 is a partial longitudinal sectional view of the reducer of FIG. 7.
Figure 9:
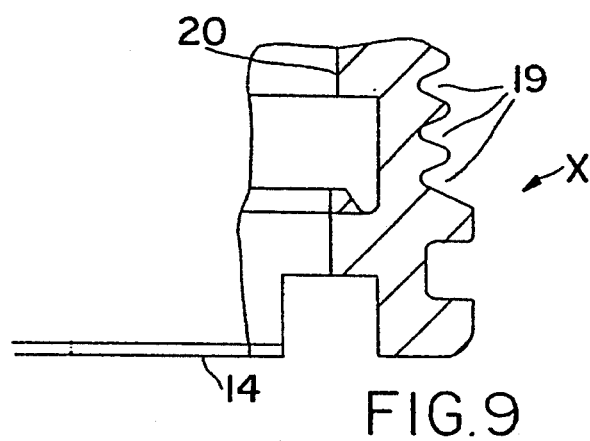
FIG. 9 is an enlarged portion taken from the view of FIG. 8.
Figure 11:
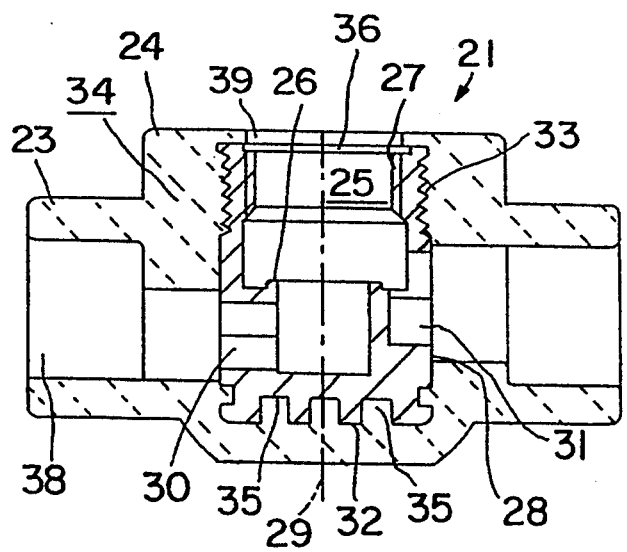
FIG. 11 is a longitudinal sectional view of the shut-off valve of FIG. 10.
Figure 10:
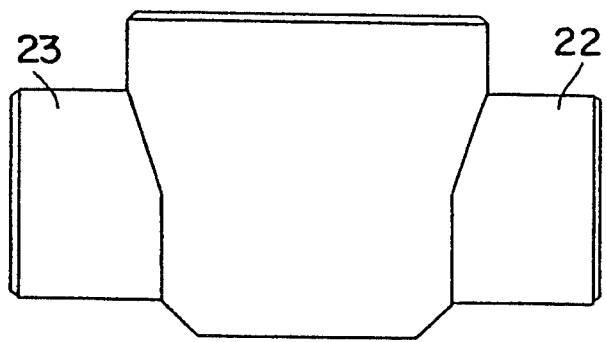
FIG. 10 is a side view of a shut-off valve.
Figure 12:
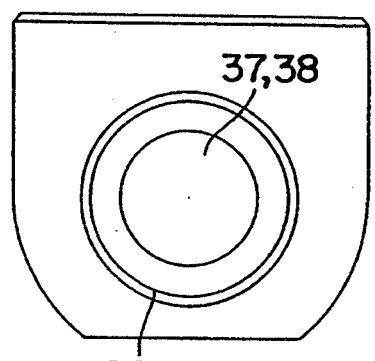
FIG. 12 is an end view of the shut-off valve of FIG. 10.
Figure 13:
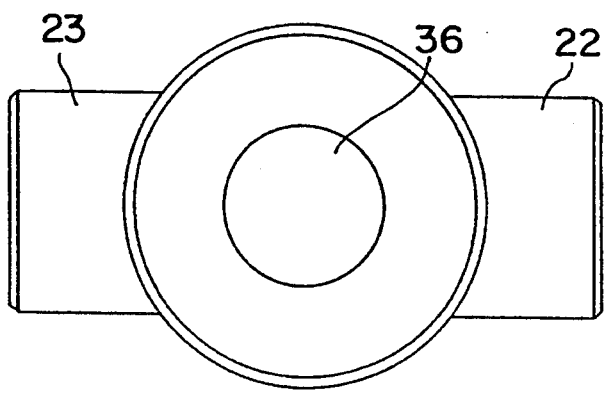
FIG. 13 is a plan view of the shut-off valve of FIG. 10.

The metallic connecting sleeve 12 illustrated in FIGS. 7 to 9 has a continuously nickel-plated surface 17 and forms part of a reducer 18. To this end its outer surface is sheathed in a thermoplastic material 15 such as, for instance, a polyether ketone which is illustrated in the drawing by a dotted surface and is injection-moulded onto the surface 17. Inbetween the two end faces 13, 14 of the connecting sleeve this surface is provided with annular grooves 19 on the cylindrical outer circumference, said annular grooves constituting a series of successive parallel conical flutes. The cone angle of the V-shaped cross-section of said flutes or grooves is c.55°, the groove depth is c.1.2 mm and the pitch of the successive grooves is c.2 mm.

Furthermore, the rear end face 14 is formed with a plurality of parallel slots 16 and with a bore for welding a plastic pipe therein which is to be connected via the reducer to a fitting made of metallic materials, said fitting being screwed through the forward end face 13 of the connecting sleeve into an internally threaded bore 20.

Upon injection-moulding onto the surface of the connecting sleeve, the plastic material 15 penetrates both the conical flutes or grooves 19 and the end-side slots 16 so as to anchor the connecting sleeve in this way within the plastic material tightly and locked against rotation. Due to the fact that the outer cylindrical surface 17 of the connecting sleeve is provided with the V-shaped conical flutes 19, the plastic material which shrinks after injection-moulding onto the surface will not peel off the surface, because at the flute bottom the shrink stresses are comparatively small so that the injection-moulded material will adhere to the surface to thereby prevent liquids flowing through the reducer bore from creeping along the outer surface of the connecting sleeve to cause loss of tightness of the reducer.

The shut-off valve 21 illustrated in FIGS. 10 to 13 is made of plastic material, especially polypropylene, and comprises a metallic valve seat 26 which is firmly joined to the mentioned plastic material by injection or moulding. This shut-off valve is used for installation in plumbing and heating pipelines. To this end it includes two pipe connecting sleeve members 22, 23 disposed in series along a straight line inside the bores 37, 38 of which plastic pipes may be welded. A sleeve body 24 is provided intermediate the said two pipe connecting sleeve members 22, 23 and is formed with a bore 39 extending perpendicularly to the bores 37, 38, said bore 39 comprising a valve body receptacle 25 which contains the metallic valve seat 26 and is provided in the vicinity of its top opening 36 with an internally threaded portion 27 into which the valve body—not illustrated—may be screwed.

The metallic valve body receptacle 25 is a rotary body of cylindrical configuration which is provided on a portion of its cylindrical surface 28 with flow bores 30, 31 which extend transversely to the longitudinal axis of the receptacle and extend into the bores 37 and 38 of the shutoff valve, respectively.

To prevent the fluid flowing through the shut-off valve from leaking to the outside along the outer surface of the valve body receptacle 26 in the vicinity of the bore 36, i.e. to prevent a leakage flow, the cylindrical surface 28 is provided in this region with continuous sealing grooves or flutes 33 into which upon injection or moulding of the sleeve the plastic material 34 has penetrated and which have such a configuration that the stresses occurring during cooling of the plastic material will not cause the plastic material to disengage from said grooves or flutes. To this end the cross-section of the seal grooves or flutes 33 is conical or V-shaped.

To form anti-twist means for the valve body receptacle 25 which will cause said receptacle not to twist within the plastic material of the shut-off valve when the valve body is screwed and unscrewed, the outside of the bottom 32 of the receptacle 26 opposite the bore 36 is provided with cavities 35 in the form of slots or recesses in the surface of said bottom outer side, into which slots or recesses the plastic material has penetrated upon injection or moulding.

Furthermore, a continuous annular groove 40 is provided in the vicinity of the receptacle bottom 32 on the cylindrical outer surface 28 of the sleeve, into which groove the plastic material has likewise penetrated to thereby prevent withdrawal of the valve body receptacle along its longitudinal axis 29 from the plastic material.

Figure 14:
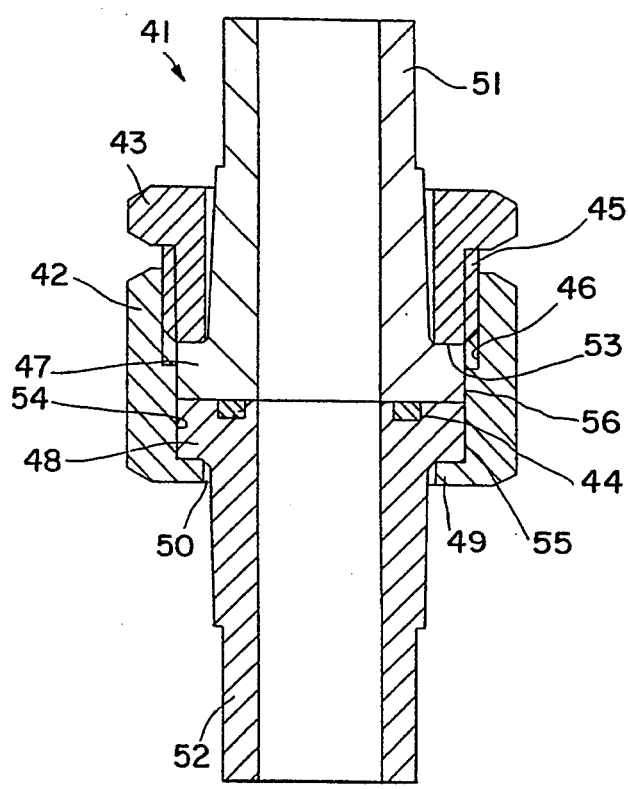
FIG. 14 is a longitudinal sectional view of a pressure-type screw connection joined to two fluid pipes to be connected to each other.
Figure 15:
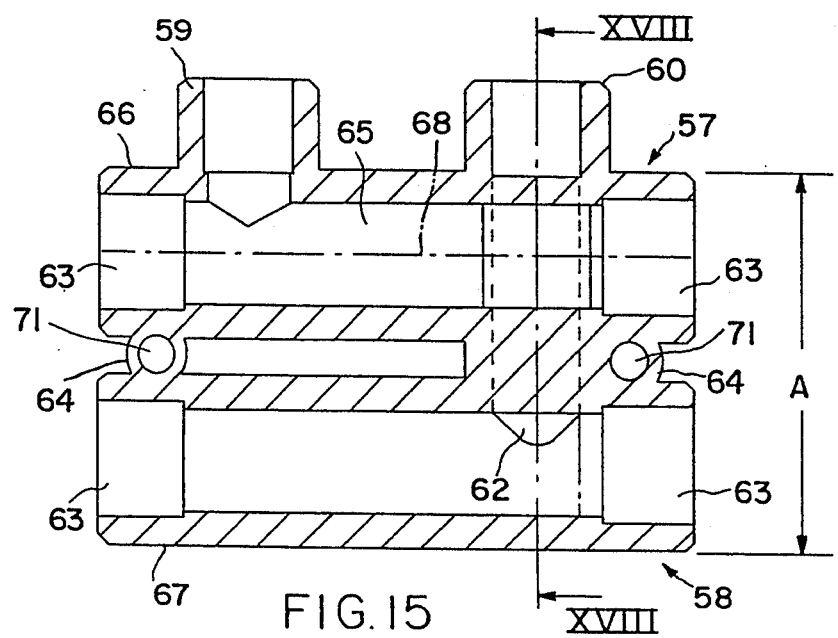
FIG. 15 is a longitudinal sectional view of a reducer for connecting radiators.

The pressure-type screw connection 41 illustrated in FIG. 14 joins the two plastic pipes 51, 52 made of polypropylene by way of the end flanges 47, 48 thereof via a union nut 42 and a nut 43 adapted to be screwed thereon, said nuts being made of metal. Hot, aggressive liquid is transported under pressure through the pipes 51, 52. The pipes are designed to withstand pressures of up to 25 bar at temperatures of up to 70° C.

One end flange 48 is provided with an O-ring 44. This end flange rests against an annular flange 49 of the union nut 42. To this end the annular flange has a central opening 50 for the passage of the liquid pipe 52 therethrough.

In the screw-fitted state of the two nuts 42, 43, the outer circumference 56 of the end flange 47 of said one liquid pipe 51 together with the outer circumference 55 of the annular flange 48 of the other liquid pipe 52 rests against the inner circumferential surface 54 of the union nut 42 the outer diameter of which corresponds to the outer diameter of the nut 43.

When the two liquid pipes 51, 52 are joined, the two nuts 42, 43 are pushed over these pipes whereupon the screw thread 45 of the nut 43 is screwed into the internal screw thread 46 of the union nut until its end face 53 urges the annular flange 47 of the liquid pipe 51 against the annular flange 48 of the liquid pipe 52 disposed therebeneath, so that the O-ring 44 effects a pressure-tight seal.

The reducer shown in FIGS. 15–20 is made of plastic material, appropriately of polypropylene, and comprises the two superposed pipe pieces 57, 58 which are used to connect a radiator and which may to this end be connected to the heating water flow and return of such a radiator through pipe unions 59, 60 which form an integral unit with the upper pipe piece 57.

In order to enable the two heating pipes for flow and return to be installed behind the skirting board of the room which is to be equipped with central heating, and thus to be installed in concealed fashion, the reducer which is fitted into the heating pipes via the end-side connecting sleeves 63 should occupy minimum space. That means that the overall height A (FIG. 15) of the reducer without pipe union 59, 60 must not be higher than the skirting board, and that its overall depth B (FIG. 16) must be as small as possible so that the wall spacing from the skirting board does not become too large.

To this end the two pipe pieces 57, 58 are disposed with a small spacing therebetween and are joined through connecting members 64 which are formed with through-bores 71 for receiving bolts by means of which the reducer can be bolted to the wall. Furthermore, the one pipe union 60 bridges the cross-section 65 of the upper pipe piece 57 inside the contour 66 of said pipe piece by means of a bridging passageway 61 which opens into the lower pipe piece 58 inside the contour 67 thereof, as will be apparent at 62 in FIGS. 15 and 18.

This bridging of the flow or return within the reducer prevents the overall depth B from exceeding the outer diameter of each pipe piece 57, 58.

The clear width 72 of the bridging passageway 61 may occupy approximately half the flow cross-section 73 of the upper pipe piece 57. Suitably, the bridging passageway 61 extends perpendicularly to the longitudinal axis 68 of the pipe piece 57, but if necessary it could also extend in any other suitable way.

Figure 16:
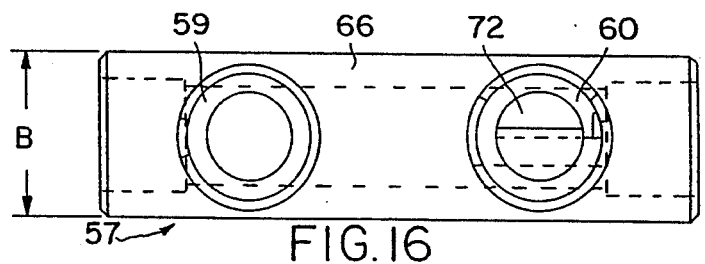
FIG. 16 is a plan view of the reducer of FIG. 15.
Figure 17:
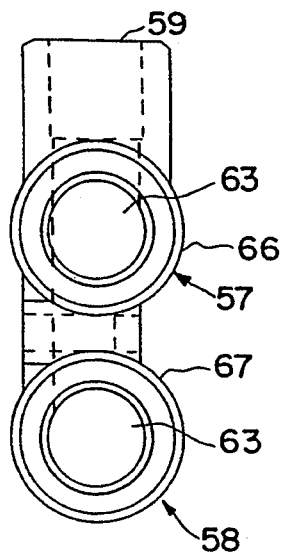
FIG. 17 is a side view of the reducer of FIG. 15.
Figure 18:
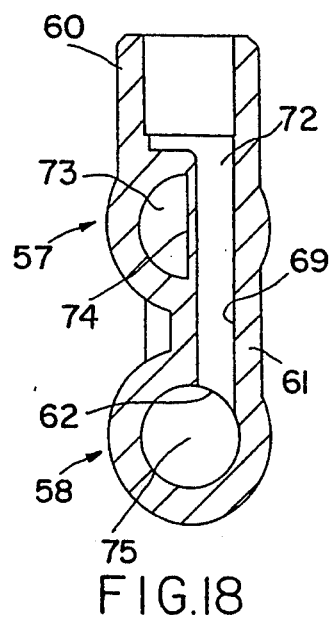
FIG. 18 is a sectional view of the reducer of FIG. 15 along the line C-D of FIG. 15.

Thereby the bridging passageway 61 adopts an off-centre position relative to the cross-section of the pipe pieces 57, 58, as will be apparent from FIGS. 16 and 18. From the latter Figure it is also apparent that the outer wall 69 of the bridging passageway 61, which is remote from the cross-sectional centres 74, 75 of the pipe pieces 57, 58, extends approximately tangentially to the cross-section 70 of the lower pipe piece 58 and opens into the same via the common edge of intersection 62.

Figure 19:
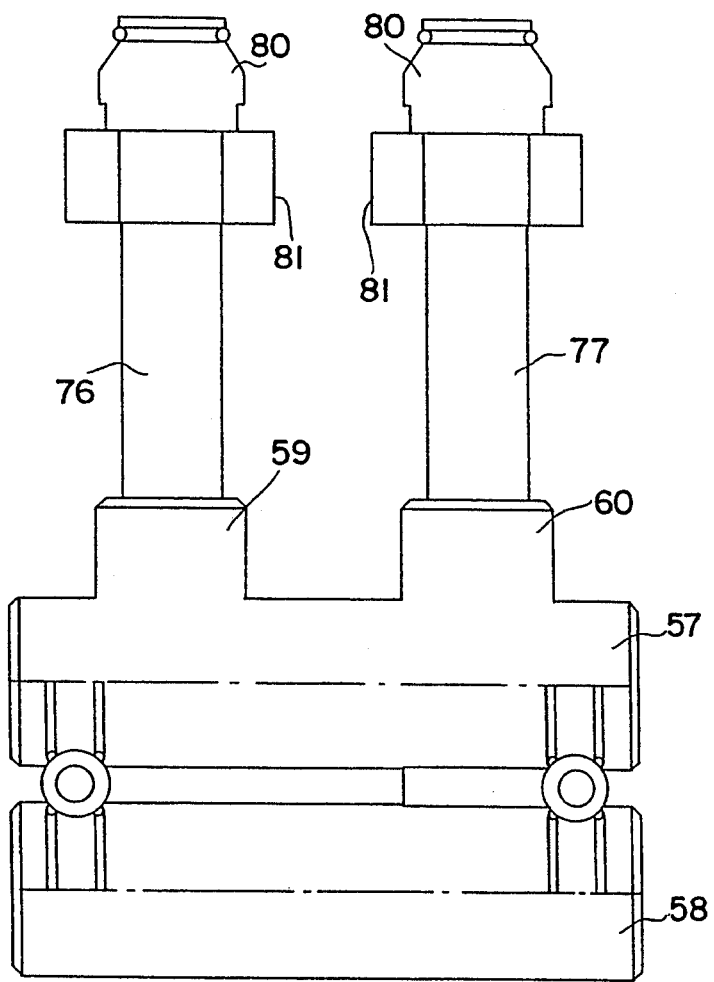
FIG. 19 is a view similar to FIG. 15, but non-sectional, showing the reducer with welded straight pipe sleeves.

The pipe unions 59, 60 on one of the two superposed pipe pieces 57, 58, which are used for heating water flow and return, respectively, may be welded, as will be seen from FIG. 19, to straight pipe connecting pieces 76, 77 the free ends 80 of which are provided with union nuts 81 for connection to radiator valves.

Figure 20:
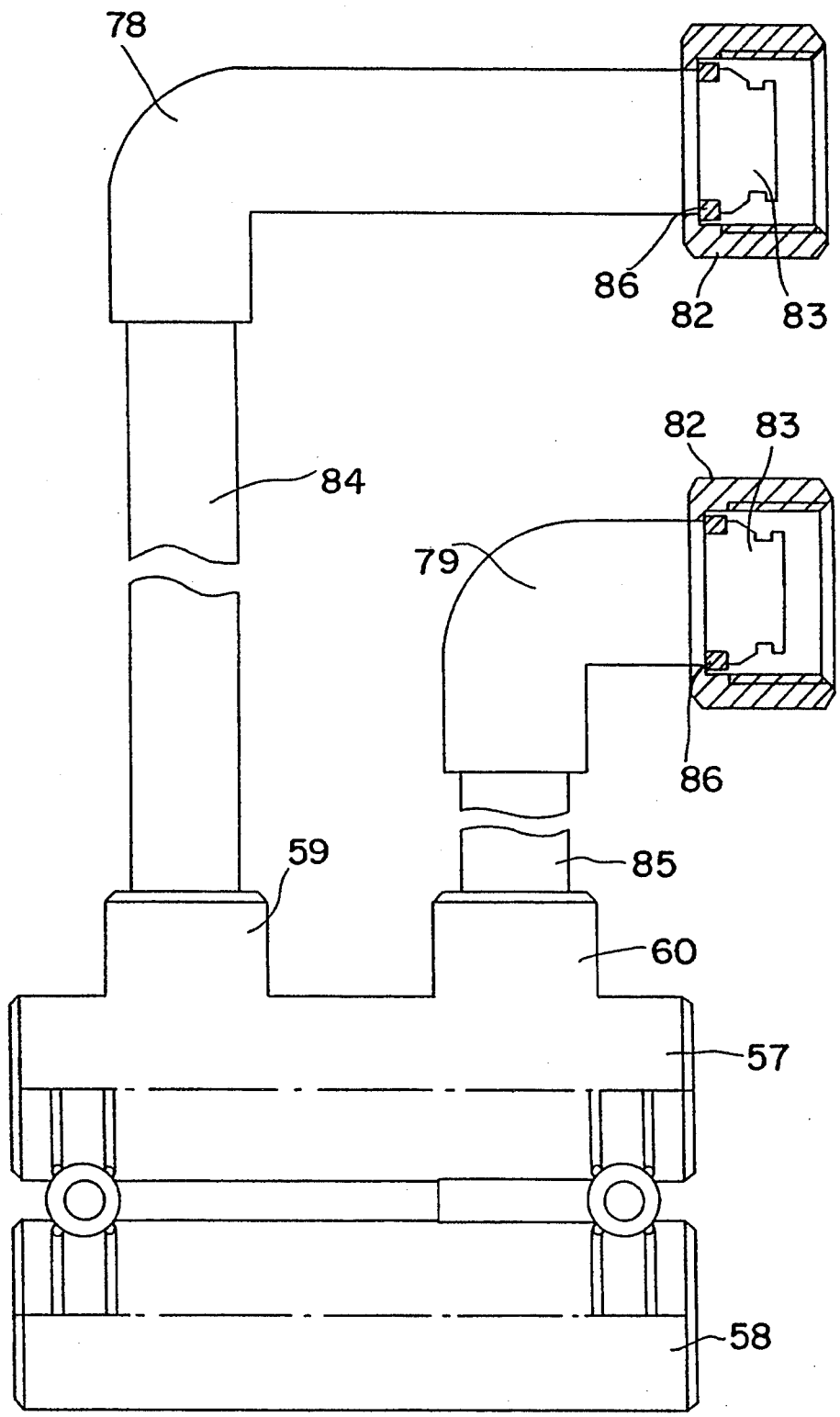
FIG. 20 is a view similar to FIG. 15, but non-sectional, showing the reducer with welded bent pipe sleeves.

FIG. 20 shows a comparable structure in which, however, the reducer which might also be called a double-T-junction is welded to arcuate pipe connecting pieces 78, 79 with straight pipe pieces 84, 85 provided therebetween to achieve the desired distance as to height between these pipe connecting pieces. The ends 83 of the arcuate pipe connecting pieces are again equipped with union nuts 82 for connection to the valve, said union nuts being retained on the ends 83 by means of retaining rings 86.

Figure 21:
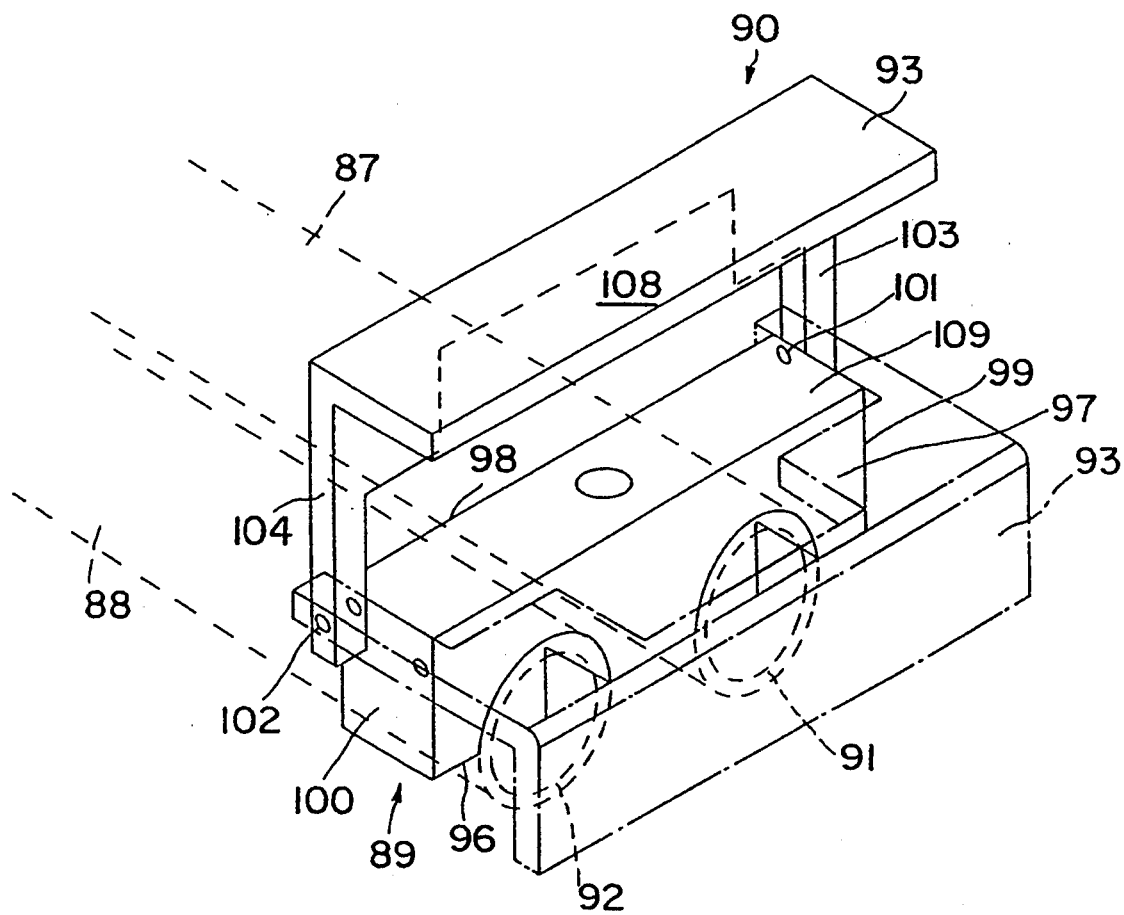
FIG. 21 is an isometric view of the arrangement for a welding device for welding parallel plastic pipes with the upwardly pivoted bracket body (full line) and downwardly pivoted bracket body (thin line), but without screw member.
Figure 22:
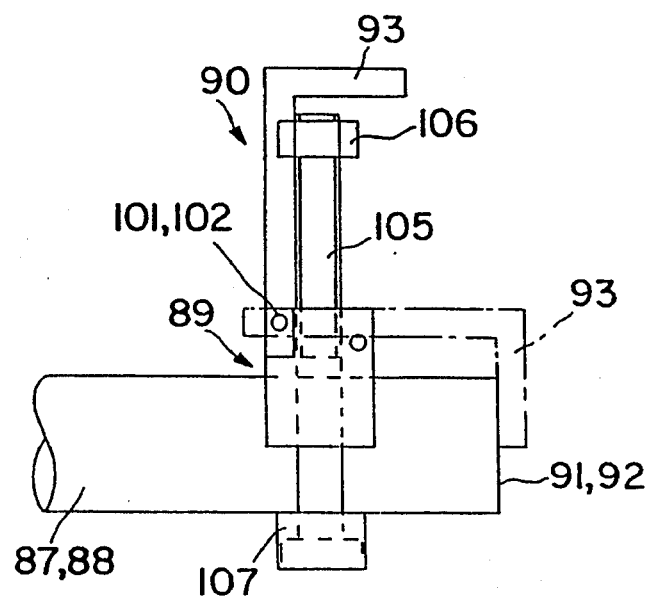
FIG. 22 is a side view of the apparatus of FIG. 21 with the screw member in the mounted state.

The apparatus shown in FIGS. 21 and 22 comprises a parallelepipedic straddling body 89 and a bracket member 90 pivotally connected thereto and is adapted to be placed on two parallel plastic pipes 87, 88 so as to maintain the pipes at a desired distance from each other and to equalize the pipe ends 91, 92, i.e. to dispose them in a common plane, so that desired welding work may be performed on the pipes 87, 88 without any movement of the pipes relative to each other or to the welding device.

The underside 96 of the straddling body 89 is formed with two recesses 94, 95 extending in the longitudinal direction of the pipes and having semi-circular contour, as will be apparent from the two opposite side faces 97, 98. The diameter of these semi-circular recesses corresponds to the outer diameter of the pipes 87, 88 so that the straddling body may straddle the pipes to keep them at a distance from each other. The bracket member 90 is pivotally mounted on the end faces 99, 100 of the straddling body 89 by means of pivots 101, 102 and is adapted to be tilted about said pivots by approximately 90° from its upright position illustrated in thick lines in FIG. 21 to its horizontal position illustrated in thin lines, in which position its end plate 93 abuts the end faces of the pipe ends 91, 92. Thereby the apparatus is also fixed in longitudinal direction relative to the pipes 87, 88.

To prevent the apparatus from lifting off the surface of the pipes there is provided a screw member 105 which passes perpendicularly through the top 109 of the straddling body 89 between the two pipes and exits from the bottom 96 of the straddling body, as will be apparent from FIG. 22. The lower end of the screw member 105 is provided with a transverse piece 107 which is pressed against the pipes 87, 88 by the screw member 105. By means of a nut 106 mounted on the shaft of the screw member 105 it is possible in this way to clamp the straddling body 89 onto the pipes so that it is prevented from automatically lifting off said pipes.

The bracket member 90, which is an L-section member the short leg of which forms the end plate 93, has a long leg with a central recess 108 which is defined by two lateral arms 103, 104 supporting the bracket member via the pivots 101, 102 on the end faces 99, 100. The support is configured such that in the downwardly pivoted state the bracket member lies with the top of the arms 103, 103 in the plane of the top 109 of the straddling body 89, as will be apparent from FIG. 21.

I claim:

1. Plumbing and heating pipe system for water supply purposes, made substantially of plastic material, including shut-off valves of plastic material having a plastic-sheathed metallic valve seat for installation in pipelines, and including two serially disposed pipe connecting sleeve pieces and an internally threaded valve body receptacle therebetween to form said valve seat, the valve body adapted to be screwed into the internal screw thread of said valve body receptacle, the improvement comprising that the metallic valve body receptacle is a rotary body of cylindrical contour which is provided on a portion of its cylindrical outer surface with flow bores which extend transversely to its longitudinal axis and can be closed by means of the valve body, while on other portions of its cylindrical outer surface it is provided with anti-twist means and with sealing members against leakage of fluid from the pipe connecting sleeve pieces.

2. The system claimed in claim 1, characterized in that the valve body receptacle is provided on its cylindrical outer surface in the vicinity of its opening with continuous seal grooves into which the plastic material penetrates when the valve body receptacle is plastic-encased.

3. The system claimed in claim 1, characterized in that the receptacle bottom which is opposite the opening of the valve body receptacle is provided on the outside thereof with recesses in the form of slots and cut-outs into which the plastic material penetrates to form anti-twist means.

4. The system claimed in claim 1, characterized in that in the vicinity of the bottom of the valve body receptacle an annular groove is formed on the cylindrical outer surface of said receptacle into which the plastic material penetrates to provide a connection of high tensile strength between the plastic material and the valve body receptacle.

5. The system claimed in claim 2, characterized in that the cross-section of the seal grooves are V-shaped.

6. Plumbing and heating pipe system for water supply purposes, made substantially of plastic material, including pressure-type screw connections especially for hot water and aggressive liquids, the improvement comprising an internally threaded union nut with a bottom-side annular flange provided with a central opening for the passage of one or two liquid pipes therethrough and intended to receive an end flange of said one liquid pipe, and comprising an externally threaded nut which surrounds the other one of said liquid pipes and is adapted to be screw-connected with said union nut and the lower end of which is adapted to be screwed against an end flange of said other liquid pipe, said end flange of said other liquid pipe engaging the end flange of said one liquid pipe.

7. The system claimed in claim 6, characterized in that an O-ring seal is provided in at least one of said two end flanges to ensure the tightly sealed connection between the two liquid pipes.

8. The system claimed in claim 6, characterized in that the outer circumference of the end flange of said one liquid pipe together with the outer circumference of the end flange of said other liquid pipe engages the inner circumferential surface of the union nut when the two nuts are screwed together.

9. The system claimed in claim 6, characterized in that the outer diameter of said union nut corresponds to the outer diameter of said nut.

10. Plumping and heating pipe system for water supply purposes, made substantially of plastic material, including reducers for connecting radiators in rooms, especially for installation of the heating pipes so as to be concealed by a skirting board, consisting of two inter-connected pipe pieces having ends and which follow the extension of the skirting board and of which one pipe piece is connectable to the heating water flow while the other one is connectable to the heating water return, the improvement comprising that the two inter-connected pipe pieces are disposed one above the other and the upper pipe piece includes the two pipe unions for the heating water flow and return, respectively, of which the one pipe union bridges the cross-section of the upper pipe piece inside the contour of said pipe piece by means of a bridging passageway which opens into the lower pipe piece inside the contour thereof.

11. The system claimed in claim 10, characterized in that the two inter-connected pipe pieces extend parallel to each other and are provided at their ends with connecting sleeves for the heating pipes.

12. The system claimed in claim 10, characterized in that the clear width of the bridging passageway occupies approximately half the flow cross-section of the upper pipe piece.

13. The system claimed in claim 10, characterized in that the outer wall of the bridging passageway which faces away from the cross-sectional centres of the pipe pieces extends approximately tangentially to the cross-section of the lower pipe piece and opens into the same.

14. The system claimed in claim 10, characterized in that the pipe unions for the heating water flow and return are adapted to be welded to straight connecting members the free ends of which carry a union nut for connection to a valve.

15. Plumping and heating pipe system for water supply purposes, made substantially of plastic material, including an arrangement for a welding device for welding parallel plastic pipes having ends and by means of which arrangement the ends of the plastic pipes can be equalized as to their lengths, the improvement comprising a straddling body adapted to be disposed on the parallel plastic pipes and having an upwardly pivotable bracket member which in its upwardly pivoted position can be pivoted downwards transversely to the longitudinal pipe axis across the pipe ends and is provided with an end plate for abutment of the pipe ends thereat.

16. The system claimed in claim 15, characterized in that the straddling body is formed with approximately semi-circular recesses which extend in longitudinal direction of the pipes at the spacing of the parallel pipes, said recesses having a diameter which is matched with the outer diameter of the pipes and having the pipes to be welded seated therein.

17. The system claimed in claim 15, characterized in that the straddling body is a parallelepiped the underside and the two opposed side faces of which include said recesses and to the smaller end faces thereof, which limit the two side faces, the bracket member is pivotally mounted by means of pivots and is adapted to be pivoted by about 90°.

18. The system claimed in claim 17, characterized in that the bracket member is an L-section member the short leg of which forms the end plate and the long leg of which is formed with a central recess which is limited by two lateral arms supported by said pivots.

19. The system claimed in claim 18, characterized in that the support of the lateral arms relative to the end faces of the straddling body is arranged so that the surface of the long leg of the U-section of the bracket member in the downwardly pivoted state lies in the plane of the top of the straddling body.

20. The system claimed in claim 15, characterized in that a screw member is passed perpendicularly through the top of the straddling body and exits between the two parallel pipe from the underside of the straddling body where it carries a transverse piece which is adapted to be urged by the screw member against the pipes to clamp the straddling body to the pipes by means of a nut.

* * * * *